(12) United States Patent
Yuan et al.

(10) Patent No.: US 8,488,725 B2
(45) Date of Patent: Jul. 16, 2013

(54) METHOD AND SYSTEM FOR SPATIAL CHANNEL STATE INFORMATION FEEDBACK BASED ON A KRONECKER PRODUCT

(75) Inventors: Yifei Yuan, Iselin, NJ (US); Shupeng Li, Iselin, NJ (US); David Huo, Iselin, NJ (US)

(73) Assignees: ZTE Corporation, Shenzhen (CN); ZTE (USA) Inc., Richardson, TX (US)

( * ) Notice: Subject to any disclaimer, the term of this patent is extended or adjusted under 35 U.S.C. 154(b) by 281 days.

(21) Appl. No.: 12/984,969

(22) Filed: Jan. 5, 2011

(65) Prior Publication Data

US 2011/0170638 A1    Jul. 14, 2011

Related U.S. Application Data

(60) Provisional application No. 61/282,275, filed on Jan. 12, 2010.

(51) Int. Cl.
| | | |
|---|---|---|
| H03D 1/04 | (2006.01) | |
| H03D 1/06 | (2006.01) | |
| H03K 5/01 | (2006.01) | |
| H03K 6/04 | (2006.01) | |
| H04B 1/10 | (2006.01) | |
| H04L 1/00 | (2006.01) | |
| H04L 25/08 | (2006.01) | |

(52) U.S. Cl.
USPC ........... 375/346; 375/260; 375/349; 375/347; 375/299; 375/267; 455/500; 455/501; 455/504; 455/63.1; 455/65

(58) Field of Classification Search
USPC .. 375/346, 349, 347, 299, 267, 260; 455/500, 455/501, 504, 63.1, 65
See application file for complete search history.

(56) References Cited

U.S. PATENT DOCUMENTS

2009/0046807 A1* 2/2009 Xia et al. ............... 375/299
2011/0085610 A1* 4/2011 Zhuang et al. ......... 375/260

* cited by examiner

*Primary Examiner* — Phuong Phu
(74) *Attorney, Agent, or Firm* — Novak Druce Connolly Bove + Quigg LLP

(57) ABSTRACT

A spatial channel state information (CSI) feedback technique is incorporated into multiple-input multiple-output mobile communications technologies. Spatial channel state information is measured at receiving equipment and then decomposed into components. The components are then quantized using codebook(s) and fed back as multiple indices to transmitting equipment.

28 Claims, 2 Drawing Sheets

METHOD AND SYSTEM FOR SPATIAL CHANNEL STATE INFORMATION FEEDBACK BASED ON A KRONECKER PRODUCT

PRIORITY

Priority is claimed to U.S. Provisional Patent Application No. 61/282,275, filed Jan. 12, 2010, the disclosure of which is incorporated herein by reference in its entirety.

FIELD OF THE INVENTION

The field of the present invention pertains to providing spatial channel state information (CSI) for mobile communication enhanced by multiple-input multiple-output technologies.

BACKGROUND

Multiple-input multiple-output (MIMO) is a family of techniques that utilize multiple antennas at the transmitter or at the receiver, or at both the transmitter and the receiver, to exploit the spatial dimension in order to improve data throughput and transmission reliability. The data throughput can be increased by either spatial multiplexing or beamforming.

Spatial multiplexing allows multiple data streams to be transmitted simultaneously to the same user through parallel channels in the MIMO setting, especially for diversity antennas where spatial correlation between antennas (both at the transmitter and the receiver) is low. Beamforming helps to enhance the signal-to-interference-plus-noise ratio (SINR) of the channel, thereby improving the channel rate. Such SINR improvement is achieved by proper weighting over multiple transmit antennas. The weight calculation can be based on either long-term measurement (e.g., open-loop) or via feedback (e.g., closed-loop). Closed-loop transmit weighting is often called precoding in the context of MIMO study.

FIG. 1 illustrates a precoded MIMO for a single user (SU) where M data streams, $u_1, \ldots, u_M$, are spatially multiplexed by exploiting the M by N spatial channel matrix H. Since the number of transmitter antennas N is greater than the number of receiver antennas M, precoding is applied which is denoted as the matrix F.

Precoded MIMO can also be operated in multi-user MIMO (MU-MIMO) mode to further improve the sum rate across multiple users sharing the same time and frequency resource. FIG. 2 illustrates a two-user MU-MIMO where beamforming (e.g., precoding) is used to spatially separate the two users (and improving SINR), while for each user the two data streams (light shaded and dark shaded) are spatially multiplexed.

MU-MIMO, especially the downlink MU-MIMO, is a hot topic in Third Generation Partnership Project (3GPP) Long Term Evolution-Advanced (LTE-Advanced) study as described in 3GPP TR 36.814, v1.1.1, "Further Advancements for E-UTRA, Physical Layer Aspects," June 2009. MU-MIMO may further enhance the data throughput of LTE systems. The Work Item of DL MU-MIMO was created in 3GPP Physical Layer Working Group (RAN1).

A key specification-impacting aspect of precoded MIMO is the spatial CSI feedback required for closed-loop precoding. The spatial channel matrix H as seen in FIG. 1 contains the complete spatial CSI. Alternatively, an N-by-N covariance matrix R, represented as $$R = H^H H \quad (1)$$

can provide sufficient spatial information for transmitter precoding where the superscript "H" denotes the complex conjugate. In general, it is too costly to feed back the floating-point version of H or R, which usually contains quite a number of complex coefficients in each frequency band. Quantization is therefore needed to make the feedback more efficient.

A codebook, known to both the receiver and the transmitter, is often used for CSI quantization so that only a codeword index is fed back. The codeword can be selected to either maximize the channel capacity or minimize the distance between the floating-point CSI and the quantized CSI.

Codebook design itself is a research-rich topic since a good codebook has to efficiently span the entire relevant spatial space. In that sense, generic codebooks are seldom efficient and, practically, codebooks are tailored to fit different antenna configurations and deployment scenarios. Generally speaking, the more complex the antenna configuration is, the more difficult the codebook design.

Table 1 is an excerpt from 3GPP RAN1 LTE standard specification described in 3GPP TS 36.211, "Evolved Universal Terrestrial Radio Access (E-UTRA); Physical Channels and Modulation". The codebook is used for a very simple MIMO configuration with two transmit and two receiver antennas, M=2 and N=2, as in FIG. 1. As such, the maximum number of multiplexed streams (also called the layers) is 2.

TABLE 1

A codebook in LTE specification for 2 × 2 MIMO.

| Codebook index | Number of layers $\upsilon$ | |
|---|---|---|
| | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

Compared to single-user MIMO (SU-MIMO), multi-user MIMO (MU-MIMO) requires more accurate spatial CSI feedback in order to perform effective spatial separation and multiplexing operations. As a result, the CSI feedback and the codebook design in MU-MIMO are more challenging.

In mathematics, a Kronecker product, denoted by ⊗, is an operation on two matrices of arbitrary size resulting in a block matrix. For example, $$A \otimes B = \begin{bmatrix} a_{11}B & \cdots & a_{1n}B \\ \vdots & \ddots & \vdots \\ a_{m1}B & \cdots & a_{mn}B \end{bmatrix}. \quad (2)$$

The Kronecker product has been used in codebook design, for example for cross-polarization antennas described in 3GPP, R1-094752, "DL codebook design for 8Tx MIMO in LTE-A," ZTE, RAN#59, Jeju, South Korea, November 2009 More specifically, the codebook is constructed by a Kronecker product of a LTE Rel-8 codebook and a unitary 2-by-2 matrix. Note that the idea described in 3GPP, R1-094752, "DL codebook design for 8Tx MIMO in LTE-A," ZTE, RAN#59, Jeju, South Korea, November 2009 is to have a single codebook and the feedback is still a single index of the codebook.

As described in 3GPP, R1-094844, "Low-overhead feedback of spatial covariance matrix," Motorola, RAN1#59, Jeju, South Korea, November 2009, a Kronecker product can be used for decomposing a bigger transmit covariance matrix R into two smaller matrices $R_{ULA}$ and $R_{Pol}$, so that the feedback overhead can be reduced:

$$R = R_{Pol} \otimes R_{ULA} \qquad (3).$$

The above decomposition also works in the eigen-domain by applying the mixed-product property of a Kronecker product $$\begin{aligned} R &= R_{Pol} \otimes R_{ULA} \qquad (4) \\ &= [V_{Pol} D_{Pol} V_{Pol}^H] \otimes [V_{ULA} D_{ULA} V_{ULA}^H] \\ &= [V_{Pol} \otimes V_{ULA}][D_{Pol} \otimes D_{ULA}][V_{Pol}^H \otimes V_{ULA}^H] \end{aligned}$$

where matrices "$V_{xx}$" contain the eigen-vectors of the transmit covariance matrices "$R_{xx}$", respectively. Diagonal matrices "$D_{xx}$" contain the eigen-values of the transmit covariance matrices "$R_{xx}$".

A key thing to point out is that the design principle of CSI feedback described in 3GPP, R1-094844, "Low-overhead feedback of spatial covariance matrixm," Motorola, RAN1#59, Jeju, South Korea, November 2009 is to directly quantize the transmit covariance matrices, element-by-element wise. Such an approach is drastically different from the codebook-based quantization mentioned previously. So, even after Kronecker decomposition, the content of the feedback is still covariance matrix (or matrices), rather than codebook index (or indices).

SUMMARY OF THE INVENTION

The present invention is directed toward wireless communication methods and systems which provide accurate spatial CSI feedback for MIMO operation, while keeping the feedback overhead as low as possible.

In these methods and systems, spatial channel state information is measured at receiving equipment, resulting in CSI. In some embodiments, the CSI is on a channel matrix or a covariance matrix and may further be quantized through the use of codebooks.

The CSI is decomposed, resulting in component CSIs. Each component CSI may represent characteristics of beamforming antennas or cross-polarization antennas. Beamforming antennas may further be represented as a uniform linear array (ULA).

In some embodiments, decomposition is by using a Kronecker product. Moreover, decomposition of a covariance matrix may include applying the mixed-product property of a Kronecker product.

The component CSIs are further quantized using codebook(s), resulting indices. The codebook(s) used may be the same or different, and the indices may point to a vector or a matrix in the codebook(s).

The indices are fed back to transmitting equipment and an outer product may be calculated.

Additional aspects and advantages of the improvements will appear from the description of the preferred embodiment.

BRIEF DESCRIPTION OF THE DRAWINGS

Embodiments of the present invention are illustrated by way of the accompanying drawings, in which.

DETAILED DESCRIPTION OF THE PREFERRED EMBODIMENT

Kronecker decomposition described in 3GPP, R1-094844, "Low-overhead feedback of spatial covariance matrix," Motorola, RAN1#59, Jeju, South Korea, November 2009 is applied to codebook-based CSI quantization. The approach is particularly suitable for an antenna setting that contains multiple closely-spaced cross-polarization antennas. In such a setting, the spatial correlation statistics of cross-polarization antennas and beamforming antennas are quite different.

Appropriate Kronecker decomposition must first be decided for a specific antenna configuration so that different spatial characteristics of different components of antennas can be differentiated. The sizes of component covariance matrices can be different. Then, for each component covariance matrix, an index of the codeword is chosen from an appropriate codebook suitable for the component antenna configuration.

The above process is repeated multiple times to find a set of codeword indices for each component covariance matrices that result in the best match between the quantized and the floating-point covariance matrices. The set of codeword indices is fed back to the transmitter.

At the transmitter, each quantized version of component covariance matrix is reconstructed by looking up the codeword index in the corresponding codebook. The composite covariance matrix is synthesized by a Kronecker product of all the quantized component covariance matrices.

Figure 1:
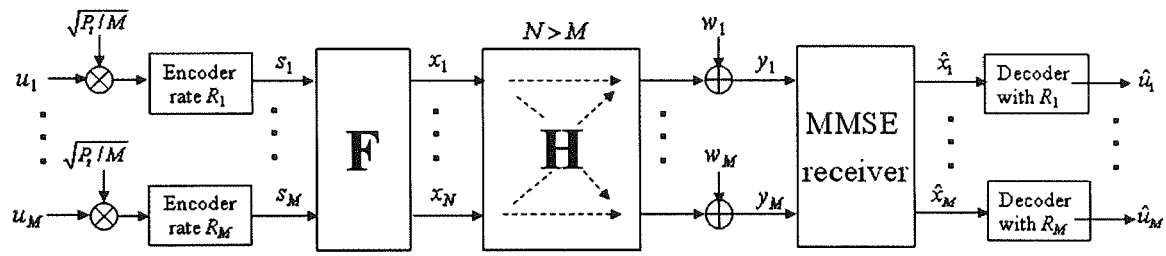
FIG. 1 illustrates a block diagram of precoded SU-MIMO with a minimum mean-squared error (MMSE) receiver.
Figure 2:
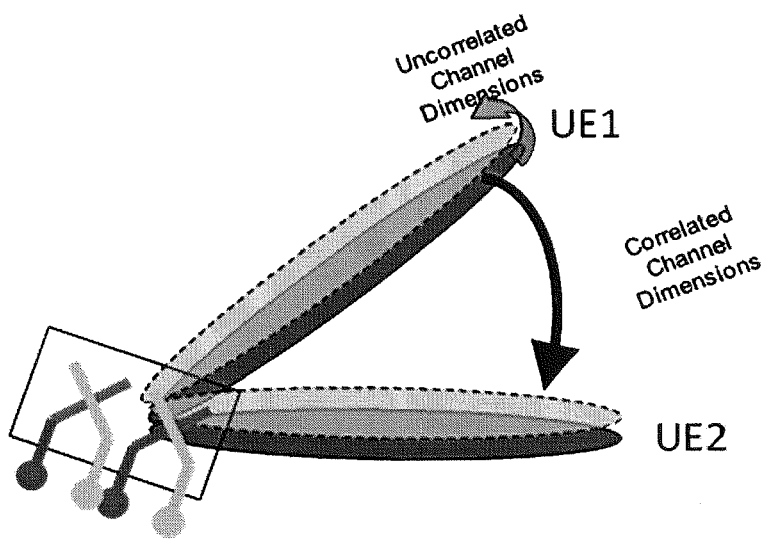
FIG. 2 illustrates a two-user MU-MIMO with two sets of closely-spaced antennas of cross polarizations.
Figure 3:
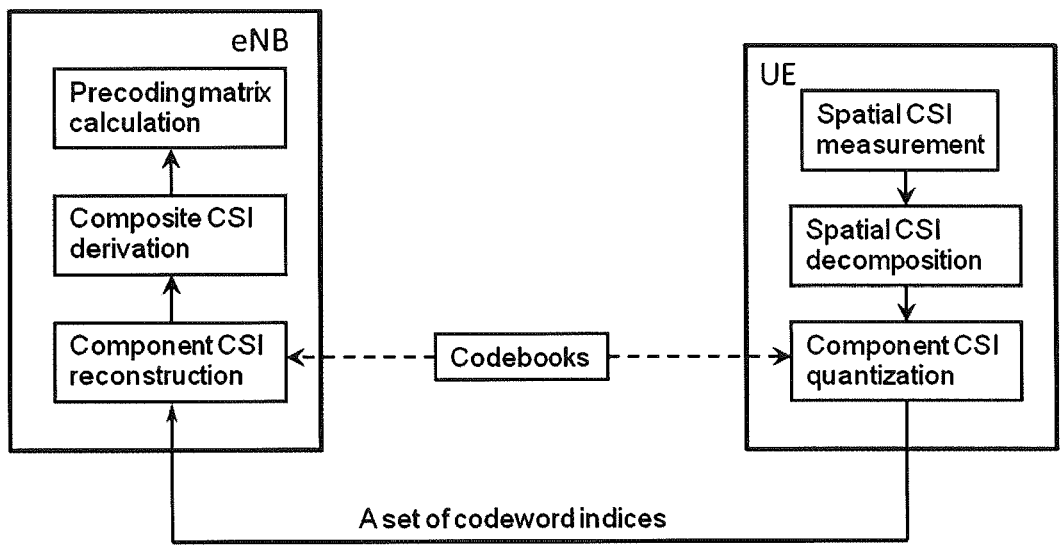
FIG. 3 illustrates a feedback setup and a block diagram relevant to the invention.

In more detail, a feedback setup and a block diagram relevant to the invention are shown in FIG. 3. FIG. 3 serves as a dual-illustration: one for an entity block illustration and the other for a block diagram of the processes.

There are two major entities in the setup: evolved node B (eNB) denotes the base station and user equipment (UE) denotes the mobile device. In this downlink example (data transmission from eNB to UE) the feedback is from UE to eNB. Both eNB and UE have multiple antennas for precoded MIMO. Of particular interest are the configurations where the number of receive antennas at the UE is smaller than the number of transmit antennas at the eNB.

Codebooks are known to both eNB and UE, based on the air-interface specifications, and can be a subset of the codebooks specified in the standards. The actual codebooks for each component CSI depend on antenna configurations and the deployment environment, and are usually decided by the network. That information can be notified to the UE via semi-static radio resource control (RRC) signaling.

At the UE, spatial CSI is measured first. The measurement can be directly on the channel matrix H, or the covariance matrix R, or other metrics. In certain embodiments of the invention, R is the major interest which can be directly estimated, or post-processed as Equation (1) shows. Here, for the simplicity of presentation, it is assumed that the measured spatial CSI, e.g., R, is of floating-point precision, although the chip implementations often use fixed-point arithmetic. In other words, it is expected that the internal quantization in the chips is much finer than the quantization for the feedback.

Figure 4:
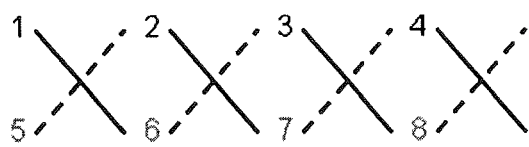
FIG. 4 illustrates an example of eight transmit antennas composed of beamforming antennas and cross polarization antennas.

Once the covariance matrix R is estimated, matrix decomposition can be carried out. To further illustrate the process, an example of eight transmit antennas (N=8) is shown in FIG. 4, where there are four antennas in each polarizations (light shaded and dark shaded). On each of the four pairs, the two antennas are mounted along the orthogonal polarization directions, +45/−45 degrees, or the so called—cross-polarizations. The spacing between adjacent beamforming elements is usually half of the wavelength to achieve four-element beamforming. Since the antenna spacing is uniform, such beamforming setting is also called Uniform Linear Array (ULA).

In this antenna configuration, high spatial correlation is expected between the four same-polarized antennas, while low spatial correlation is expected between different polarization antennas. Therefore, it is reasonable to decompose the spatial CSI between beamforming antennas and cross-polarization antennas, as Equation (3) shows. More specifically, the 8-by-8 covariance matrix is decomposed into a 4-by-4 component matrix $R_{ULA}$ and a 2-by-2 component matrix $R_{Pol}$.

Then, for each component covariance matrix, a suitable codebook is used for the quantization. The codeword index can be chosen to minimize the distance between the quantized covariance matrix and the floating-point covariance matrix. For example, the distance can be measured as, $$MSE = \frac{1}{N^2} \left\| \sum_{i=1}^{N} |\lambda_i|^2 \tilde{v}_i \tilde{v}_i^H - R_{ULA/Pol} \right\|_{Frobenius}^2 \quad (5)$$

where $\tilde{v}_i$ is the i-th quantized eigenvector of the spatial channel H which corresponds to the i-th column of the codeword and $|\lambda_i|^2$ is the i-th eigenvalue of $R_{ULA}$ or $R_{Pol}$. Note that the index can indicate either a vector or a matrix in the codebook.

For the antenna configuration shown in FIG. 4, most likely one index indicates a 4-by-1 vector (a codeword) corresponding to $R_{ULA}$. Mathematically, such 4-by-1 vector can be represented as $[1, e^{j2\pi\theta}, e^{j4\pi\theta}, e^{j6\pi\theta}]^T$ where θ is determined by the wavelength, the antenna spacing between adjacent ULA elements, and the angle of departure (AoD) of the mobile with respect to the bore-sight of the ULA. The other index indicates a 2-by-1 vector (a codeword) or 2-by-2 matrix (a codeword) corresponding to $R_{Pol}$. The 2-by-1 vector can be chosen from Table 1 for number of layers=1, for example, in the form of $[1, \alpha_1]^T$ if the normalization constant is ignored. The 2-by-2 matrix can be chosen from Table 1 for number of layers=2, for example, in the form of $[1, \alpha_1; 1, \alpha_2]^T$ if the normalization constant is ignored. As such, the spatial CSI feedback would contain two indices.

Upon receiving the CSI feedback from the UE, a series of operations are carried out. First, each quantized component CSI, e.g., $R_{ULA}$ or $R_{Pol}$, is reconstructed by looking up the fed back index in the corresponding codebook and then doing the outer product, e.g., $$\sum_i |\lambda_i|^2 \tilde{v}_i \tilde{v}_i^H.$$

Next, the quantized composite CSI, e.g., R, is derived by the Kronecker product of quantized $R_{ULA}$ and $R_{Pol}$. Finally, the quantized composite CSI is used to calculate the precoding matrices.

The above composite spatial CSI reconstruction process at the transmitter can also be pre-processed by combining the codebook for beamforming ULA and the codebook for cross-polarizations. The principle follows Eq. (4) which is Kronecker product of eigen-values for beamforming ULA and cross-polarizations. Specifically, the combining is performed by Kronecker product of the codeword vector or matrix of cross-polarizations, for example, $[1, \alpha_1]^T$ or $[1, \alpha_1; 1, \alpha_2]^T$, and the codeword vector of ULA, for example, $[1, e^{j2\pi\theta}, e^{j4\pi\theta}, e^{j6\pi\theta}]^T$. Each codeword in the combined codebook, while still separately indexed for ULA and cross-polarizations, would take the form such as $[1, e^{j2\pi\theta}, e^{j4\pi\theta}, e^{j6\pi\theta}, \alpha_1, \alpha_1 e^{j2\pi\theta}, \alpha_1 e^{j4\pi\theta}, \alpha_1 e^{j6\pi\theta}]^T$ for rank=1, or $[1, e^{j2\pi\theta}, e^{j4\pi\theta}, e^{j6\pi\theta}, \alpha_1, \alpha_1 e^{j2\pi\theta}, \alpha_1 e^{j4\pi\theta}, \alpha_1 e^{j6\pi\theta} \alpha_2, \alpha_2 e^{j2\pi\theta}, \alpha_2 e^{j4\pi\theta}, \alpha_2 e^{j6\pi\theta}]^T$ for rank=2.

While embodiments of this invention have been shown and described, it will be apparent to those skilled in the art that many more modifications are possible without departing from the inventive concepts herein. The invention, therefore, is not to be restricted except in the spirit of the following claims.

What is claimed:

1. A method of providing spatial channel state information for multiple-input multiple-output technologies having transmitting equipment and receiving equipment, the method comprising:
   measuring spatial channel state information at the receiving equipment, resulting in a CSI;
   decomposing the CSI, resulting in at least a first component CSI and a second component CSI;
   quantizing the first component CSI and the second component CSI using one or more of a plurality of codebooks, resulting in at least a first index and a second index, wherein both the first index and the second index point to either (i) a vector in one of the plurality of codebooks, or (ii) a matrix in one of the plurality of codebooks; and
   feeding back the first index and the second index to the transmitting equipment.

2. The method of claim 1, wherein decomposing the CSI includes decomposing the CSI using a Kronecker product.

3. The method of claim 1, wherein decomposing the CSI includes decomposing the CSI according to $R = R_{Pol} \otimes R_{ULA}$ where $R_{ULA}$ is the first component CSI and $R_{Pol}$ is the second component CSI.

4. The method of claim 1, wherein the CSI represents a channel matrix H or a covariance matrix R.

5. The method of claim 4, wherein at least one of the channel matrix H and the covariance matrix R are quantized.

6. The method of claim 4, further comprising decomposing the covariance matrix R into a 4-by-4 first component matrix $R_{ULA}$ and a 2-by-2 second component matrix $R_{Pol}$.

7. The method of claim 4, wherein decomposing the covariance matrix R includes applying the mixed-product property of a Kronecker product.

8. The method of claim 1, wherein quantizing the first component CSI and the second component CSI includes quantizing the first component CSI and the second component CSI using different ones of the plurality of codebooks, respectively.

9. The method of claim 1, wherein the quantizing comprises calculating a distance measured as $$MSE = \frac{1}{N^2} \left\| \sum_{i=1}^{N} |\lambda_i|^2 \tilde{v}_i \tilde{v}_i^H - R_{ULA/Pol} \right\|_{Frobenius}^2,$$

where $\tilde{v}_i$ is a i-th quantized eigenvector of a spatial channel H which corresponds to the i-th column of a codeword, $|\lambda_i|^2$ is a i-th eigenvalue of one of a first component matrix $R_{ULA}$ and a second component matrix $R_{Pol}$, and N is the number of transmitter antennas.

10. The method of claim 1, wherein the CSI is represented by a Kronecker product of two codewords, a first codeword being a 4-by-1 vector, and a second codeword being one of a 2-by-1 vector and a 2-by-2 matrix.

11. The method of claim 1, wherein the first component CSI represents characteristics of beamforming antennas, and the second component CSI represents characteristics of cross-polarization antennas.

12. The method of claim 11, wherein the characteristics of beamforming antennas are represented by a uniform linear array (ULA) containing four elements and the characteristics of cross-polarization antennas are represented by two antenna elements.

13. The method of claim 1, further comprising calculating an outer product.

14. The method of claim 13, wherein the calculating is characterized by $$\sum_i |\lambda_i|^2 \tilde{v}_i \tilde{v}_i^H,$$

where $\tilde{v}_i$ is a i-th quantized eigenvector of a spatial channel H which corresponds to the i-th column of a codeword and $|\lambda_i|^2$ is a i-th eigenvalue of one of a first component matrix $R_{ULA}$ and a second component matrix $R_{Pol}$.

15. A system of providing spatial channel state information for multiple-input multiple-output technologies, the system comprising:
means for measuring spatial channel state information at the receiving equipment, resulting in a CSI;
means for decomposing the CSI, resulting in at least a first component CSI and a second component CSI;
means for quantizing the first component CSI and the second component CSI using one or more of a plurality of codebooks, resulting in at least a first index and a second index, wherein both the first index and the second index point to either (i) a vector in one of the plurality of codebooks, or (ii) a matrix in one of the plurality of codebooks; and
feeding back the first index and the second index to the transmitting equipment.

16. The system of claim 15, wherein the means for decomposing the CSI includes means for decomposing the CSI using a Kronecker product.

17. The system of claim 15, wherein the means for decomposing the CSI includes means for decomposing the CSI according to $R = R_{Pol} \otimes R_{ULA}$, where $R_{ULA}$ is the first component CSI and $R_{Pol}$ is the second component CSI.

18. The system of claim 15, wherein the CSI represents a channel matrix H or a covariance matrix R.

19. The system of claim 18, wherein at least one of the channel matrix H and the covariance matrix R are quantized.

20. The system of claim 18, further comprising means for decomposing the covariance matrix R into a 4-by-4 first component matrix $R_{ULA}$ and a 2-by-2 second component matrix $R_{Pol}$.

21. The system of claim 18, wherein the means for decomposing the covariance matrix R includes applying the mixed-product property of a Kronecker product.

22. The system of claim 15, wherein quantizing the first component CSI and the second component CSI includes quantizing the first component CSI and the second component CSI using different ones of the plurality of codebooks, respectively.

23. The system of claim 15, wherein the means for quantizing comprises calculating a distance measured as $$MSE = \frac{1}{N^2} \left\| \sum_{i=1}^{N} |\lambda_i|^2 \tilde{v}_i \tilde{v}_i^H - R_{ULA/Pol} \right\|_{Frobenius}^2,$$

where $\tilde{v}_i$ is a i-th quantized eigenvector of a spatial channel H which corresponds to the i-th column of a codeword, $|\lambda_i|^2$ is a i-th eigenvalue of one of a first component matrix $R_{ULA}$ and a second component matrix $R_{Pol}$, and N is the number of transmitter antennas.

24. The system of claim 15, wherein the CSI is represented by a Kronecker product of two codewords, a first codeword being a 4-by-1 vector, and a second codeword being one of a 2-by-1 vector and a 2-by-2 matrix.

25. The system of claim 15, wherein the first component CSI represents characteristics of beamforming antennas, and the second component CSI represents characteristics of cross-polarization antennas.

26. The system of claim 25, wherein the characteristics of beamforming antennas are represented by a uniform linear array (ULA) containing four elements and the characteristics of cross-polarization antennas are represented by two antenna elements.

27. The system of claim 15, further comprising means for calculating an outer product.

28. The system of claim 27, wherein the means for calculating is characterized by $$\sum_i |\lambda_i|^2 \tilde{v}_i \tilde{v}_i^H,$$

where $\tilde{v}_i$ is a i-th quantized eigenvector of a spatial channel H which corresponds to the i-th column of a codeword and $|\lambda_i|^2$ is a i-th eigenvalue of one of a first component matrix $R_{ULA}$ and a second component matrix $R_{Pol}$.

* * * * *